UNITED STATES PATENT OFFICE.

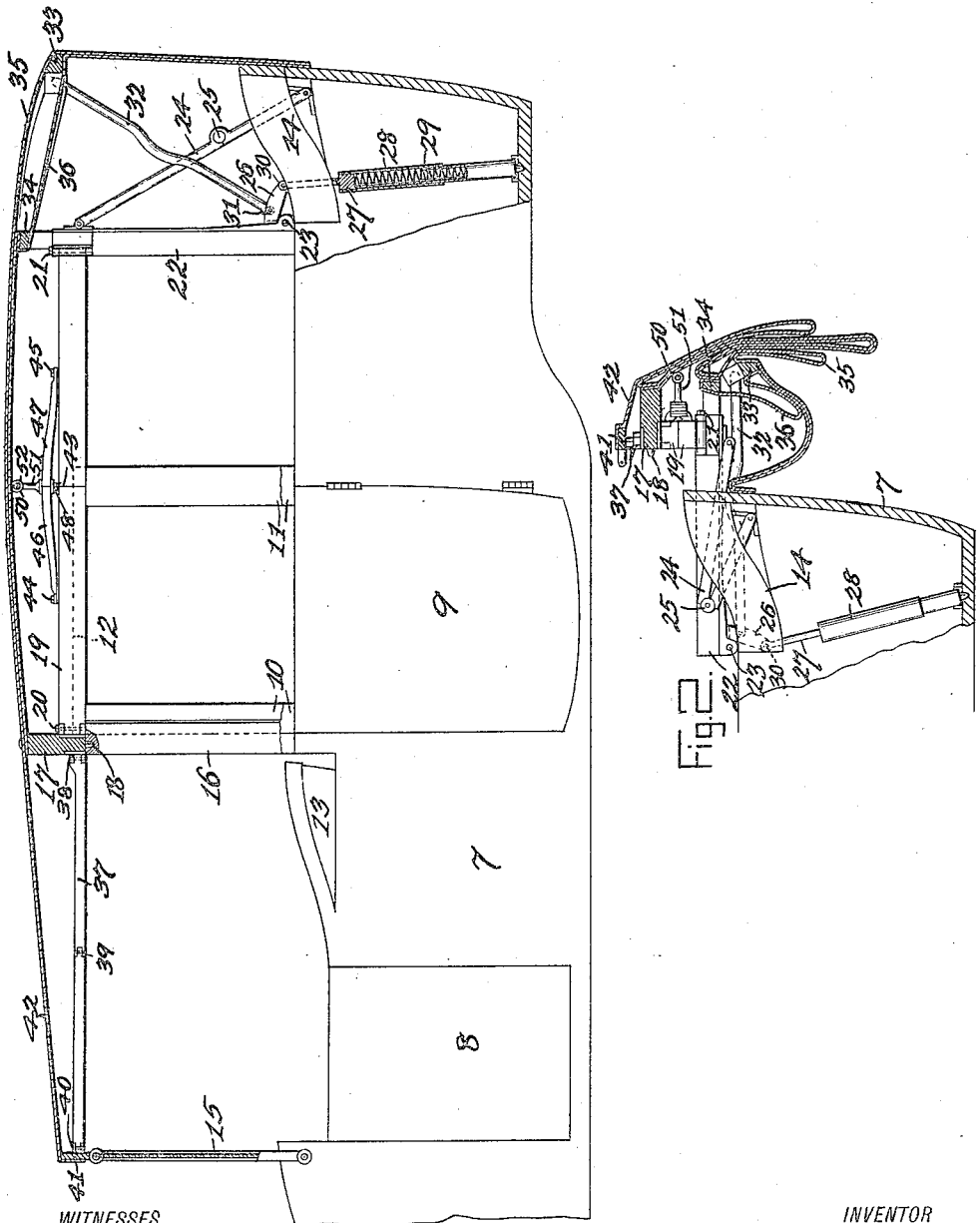

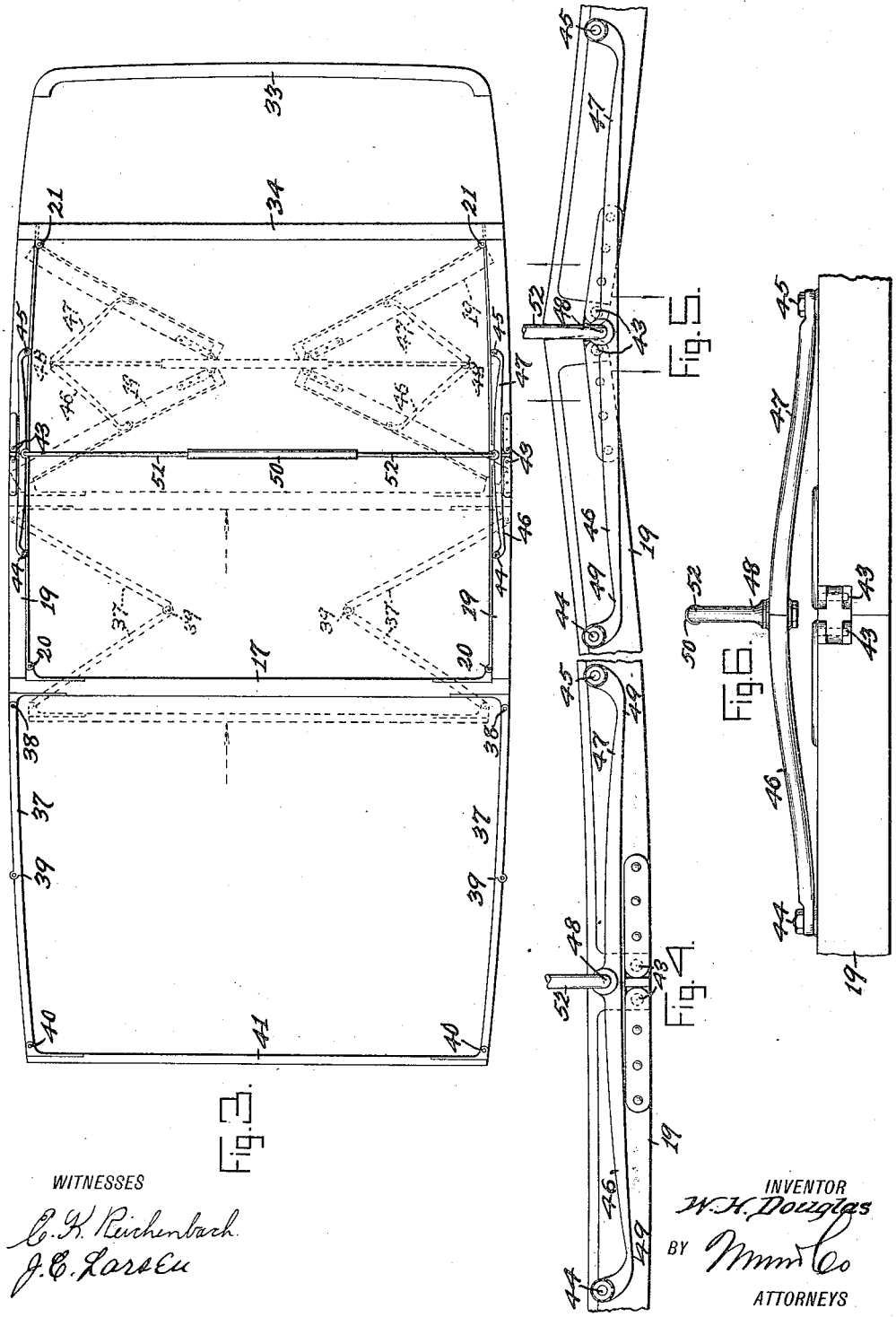

WILLIAM H. DOUGLAS, OF BELLEVILLE, NEW JERSEY, ASSIGNORS TO MESSRS. HEALEY & CO., OF NEW YORK, N. Y.

AUTOMOBILE-TOP.

1,282,550.           Specification of Letters Patent.      Patented Oct. 22, 1918.

Application filed October 14, 1916. Serial No. 125,545.

*To all whom it may concern:*

Be it known that I, WILLIAM H. DOUGLAS, a citizen of the United States, and a resident of Belleville, in the county of Essex and State of New Jersey, have invented certain new and useful Improvements in Automobile-Tops, of which the following is a specification.

My invention relates to automobile tops, and one of the objects thereof is to minimize the labor incidental to the raising and lowering of such tops into operative and into inoperative positions, respectively, by the provision of operating members which are, to an extent, automatic in operation.

A further object is to provide side bars for such a top formed of articulated members foldable in a horizontal plane inwardly from each side of the top and means for holding the same in open positions including angular members of resilient material tending to carry and hold the points of articulation of the side bar members outwardly beyond the line of stress between the end supports of said side bars.

A further object is to provide means embodying the last named principle for locking the top in lowered position in a readily released manner whenever desired, and to also provide spring means for aiding in the opening of the top into operative position.

My invention is fully described in the following specification, of which the accompanying drawings form a part, in which like characters refer to like parts in each of the views, and in which:—

Figure 1 is a side elevation of an automobile body provided with my invention shown in longitudinal section and in raised position, said body being partly broken away to show certain details of the construction;

Fig. 2 is a view thereof in lowered position, ready to be tucked into a cover or casing;

Fig. 3 is a top plan view of the frame of the top in open position, with a stage of the folding thereof indicated by dotted lines;

Fig. 4 is an enlarged fragmentary top plan view of one of the side bars of the frame and its locking means, in fully opened position;

Fig. 5 is a similar view with the side bar moved into position preparatory to folding; and Fig. 6 is an outside elevation of Fig. 4.

Referring to the drawings, 7 represents an automobile body having fore and rear doors 8 and 9 the latter of which is continued upwardly to form a frame for a vertically movable sash of the disappearing type by means of members 10, 11 and 12, preferably foldable although not necessarily, front and rear seats 13 and 14, windshield 15, and side stanchions 16 to the rear of the front seat, also preferably foldable but not necessarily.

Arranged on the tops of the stanchions 16 is a transverse beam 17 held by pins 18 in a readily detachable manner, said beam having side bars 19 hinged thereto at 20 in such a manner as to be foldable inwardly of the automobile, the other ends of said side bars being hinged in a similar manner at 21 to a stanchion 22 at each side of the automobile and pivoted to the body at 23 in such manner as to be foldable backwardly and downwardly.

The stanchions 22 are held in vertical positions by jointed braces 24 adapted to be broken at 25 to permit said stanchions to be rearwardly and downwardly folded and each of said stanchions is provided with an arm 26 in pivotal connection with a plunger 27 slidable in a cylinder 28 and normally held upwardly by means of a coil spring 29. The spring devices for the two stanchions 22 tend to force the stanchions from folded horizontal positions into vertical positions when permitted to do so.

By reference to Fig. 2 this lowered position is clearly shown and it will be noted that the pivotal point 30 between the arm 26 and plunger 27 has been carried forwardly of the line of stress between the stanchion pivot 23 and the rocking support of the cylinder 28, thus locking the stanchions in lowered positions, the arm 26, plunger 27, cylinder 28 and coil spring 29 being duplicated on the opposite side of the automobile, as will be understood.

Pivoted at 31 to each of the arms 26 is a brace rod 32 in pivotal connection at its upper end with a transverse beam 33, the beams 17, 33, and 34 on the upper ends of the stanchions, serving as supports for a flexible covering 35 which is secured at its rearward end to the back of the automobile body and at its forward end to the beam 17, and I prefer to provide a flexible mask or lining 36 to conceal the beams 33 and 34.

If is desired to protect the driver, supplemental side bars 37 may be hinged at 38 to each end of the beam 17 on its front surface in such manner as to fold inwardly in a horizontal plane, said side bars 37 being broken at 39 and being hinged at 40 to a front beam 41 which may be connected in a detachable manner with the windshield 15, a flexible cover 42 being provided over this front collapsible frame.

The side bars 19 are each formed of two members hinged together at 43, preferably by a double pintle hinge, and said members are shouldered at their contiguous ends to limit movement outwardly of the automobile, this also being true of their extreme ends where they abut against the beams 17 and 34, but said side bars may be inwardly collapsed in a horizontal plane unless prevented by the locking means to be now described and which constitute an essential feature of the invention.

Pivoted at 44 and 45 to the members of each side bar 19 are two angular spring bars 46 and 47 hinged together at 48 the axis of the pintle of the hinge 48 being directly over the break between the members of the respective side bar 19 though nearer the longitudinal central line of the top than the respective hinge 43, as are also the pivots 44 and 45.

The spring bars 46 and 47 are reduced in diameter or thickness at 49 whereby said bars may be sprung toward a straight line extending between the pivotal points 44 and 45, the angular portions of said bars yielding when an effort is made to force the hinge 43 inwardly of the top, in a horizontal plane, to carry said hinge inwardly beyond the straight line referred to and, after the axes of the pintles of the hinge 43 have passed this imaginary line, the bars 46 and 47 on resuming their normal shapes force the hinge 43 further inwardly to fold the members of the respective side bar upon each other as indicated by dotted lines in Fig. 3.

In this collapsing of the side bars 19 the spring bars 46 and 47 are folded on each other with the hinge thereof extending outwardly, and I prefer to carry the pintles of the hinges 48 upwardly and bend the same inwardly toward each other in a horizontal plane, a sleeve 50 being secured to one pintle extension 51 and slidable over the other pintle extension 52 in a telescopic manner, and these extensions and the telescopic sleeve collectively form a support for the flexible cover 35 to prevent any sagging thereof though not interfering in any way with the folding of said cover when the top is to be lowered. The device described provides a means for holding the hinged members of the side bars in extended position and against accidental collapsing and at the same time it forms an additional support for the covering 35.

When the top is up, as shown in Fig. 1, all that is necessary is to clear the beams 17 and 41 from the stanchions 16 and windshield 15, and then manually draw the two hinges 43 inwardly of the top toward each other and past the imaginary line referred to, this causing the beam 17 to approach the beam 34, and this may also be done to the side bars 37 if the driver protecting portion of the top is provided, the beams 41 and 17 moving toward and into close juxtaposition to the beam 34 and the flexible covers being plaited or folded or looped in this collapsing of the top frame.

When the parts are in the last named positions the braces 24 are broken at 25 and the entire top forced downwardly against the action of the springs 29 until the positions of the parts shown in Fig. 2 have been reached and wherein they are locked by the action of said springs on the pivots 30 in holding the latter beyond an imaginary line drawn from the pivots 23 and the rocking supports of the cylinders 28.

When it is desired to use the top, all that is needed is to manually raise the parts until the pivots 30 pass within the last named imaginary line to permit the springs 29 to cause the pivoted stanchions 22 and connected parts to fly upwardly into vertical positions, at which time the braces 24 again become operative as locking means, the brace rods 32 force the beam 33 into cover stretching position, and the sudden stoppage of the stanchions 22 causes the beams 17 and 41 to fly forwardly, the respective side bars supporting the same in a horizontal plane, after which the articulating members of said side bars may be manually forced outwardly and the beams 17 and 41 may be connected with their respective supports.

When the side bars 19 are thus forced into operative positions the hinges thereof are carried beyond the imaginary line between the pivots 44 and 45, the spring bars 46 and 47 yielding to permit such movement, after which said side bars resume their normal conditions and resist the breaking of the side bars 19 at their hinges, and this straightening of the respective side bars draws the respective covers 35 and 42 taut. It is understood that the beams 17, 33 and 34, the sectional side bars 19 and the stanchions 22 and the braces 24 and 32 together with the locking and intermediary supporting means form a supporting frame for the flexible covering 35, and by constructing the frame in the manner described it can be readily extended or collapsed by a single operator and without much physical exertion on the part of the operator.

It will thus be seen that I provide a top which is brought into operative position in a practically automatic manner, certainly with very little labor, and may be collapsed into inoperative position with a minimum of exertion and, while this ease of operation forms an important part of the invention, the spring bars 46 and 47 and their action is of equal if not of greater importance, as is also the action of the springs 29 and connected parts.

While I have shown my top adapted to a particular body structure of an automobile, I do not desire to limit myself to this type of body nor to any other type, and I reserve the right to make such changes in and modifications over the details shown and described as may be found expedient to adapt my invention to different types of automobiles, providing of course that such changes do not depart from the spirit of the invention and come within the scope of the appended claims.

Having fully described my invention, what I claim as new, and desire to secure by Letters Patent, is:—

1. An automobile top, comprising a flexible covering and a frame supporting the said covering, the said frame including side bars each made in hinged sections, supports on which the ends of the said side bars are pivoted to allow the sections of each side bar to swing in a horizontal plane, and a locking device for locking the said side bars against accidental collapsing, the locking device having supporting means for supporting the covering intermediate the said supports.

2. An automobile top, comprising a flexible covering and a frame supporting the said covering, the frame including side bars each made in sections hinged together, and a locking device for each side bar to hold the sections thereof normally in extended position, each locking device having two spring bars hinged together and having their ends pivoted on the said side bar sections at opposite sides of the hinge thereof, the hinge of the said spring bars being located inward of the hinge of the side bar sections when the latter are in extended position.

3. An automobile top, comprising a flexible covering and a frame supporting the said covering, the frame including side bars each made in sections hinged together, and a locking device for each side bar to hold the sections thereof normally in extended position, each locking device having two spring bars hinged together and having their ends pivoted on the said side bar sections at opposite sides of the hinge thereof, the hinge of the said spring bars being located inward of the hinge of the side bar sections when the latter are in extended position, the pintles of the hinges of the spring bars of the locking devices being extended in an upward direction and then bent inwardly toward each other to form telescoping supporting members for the covering.

4. An automobile top, comprising a pair of vertical stanchions pivoted to said automobile, jointed braces for said stanchions, side bars hinged to said stanchions consisting each of two members in hinged connection to move inwardly in a horizontal plane, a beam hinged to the forward ends of said side bars, a flexible cover for said frame, and a lock for holding said side bars in open positions composed, each, of two spring angular bars hinged together and pivoted to the respective members of said side bars, the line of strain between the pivotal connection of said spring bars with said side bar members being offset with respect to the hinge between said members, said spring bars yieldingly resisting inward movement of said side bars at their hinged breaks.

5. The combination in an automobile top of a frame including side bars having a hinged break intermediate their ends, and a lock for holding each side bar in extended position consisting of two angular bars of spring material hinged together and in pivotal connection with the respective members of said side bar, said last named hinge and said pivots being substantially in line adjacent the side of the side bar opposite the hinge of the latter and yieldingly resisting articulation of the respective side bar members at their hinged connections.

6. In a canopy, a covering, a first bow, a second bow, members spacing said bows and respectively pivoted to said first and second bows and comprising a plurality of parts pivoted together, said pivots being arranged to cause said members to swing in the plane assumed by said covering when said covering is extended, auxiliary members respectively pivoted to an intermediate point on one part and an intermediate point on another part and each comprising a plurality of parts pivoted together, and a bow supported by said auxiliary members.

7. In a canopy, a covering, a first bow, a second bow, a plurality of spacing members respectively extending from one bow to the other and pivoted to said bows and respectively comprising a plurality of sections pivoted together, auxiliary members pivoted to said spacing members and another bow supported by said auxiliary members, said pivots being arranged to permit said members to swing in substantially the plane of said covering.

8. In a canopy, a covering, a first bow, a second bow, a plurality of spacing members respectively extending from one bow to the other and pivoted to said bows and respectively comprising a plurality of sections pivoted together, auxiliary members pivoted to said spacing members and another bow supported by said auxiliary members, the pivots attaching said auxiliary members to said spacing members being of such a character that said auxiliary members swing relatively to said spacing members only in substantially the plane occupied by said covering when said covering is extended.

WILLIAM H. DOUGLAS.